(12) United States Patent
Soliman

(10) Patent No.: US 7,227,498 B2
(45) Date of Patent: Jun. 5, 2007

(54) WIRELESS COORDINATION AND MANAGEMENT SYSTEM

(75) Inventor: Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/453,435

(22) Filed: Jun. 14, 2006

(65) Prior Publication Data

US 2006/0244657 A1    Nov. 2, 2006

Related U.S. Application Data

(63) Continuation of application No. 10/672,824, filed on Apr. 26, 2004, now abandoned, which is a continuation of application No. 10/011,965, filed on Nov. 5, 2001, now abandoned.

(51) Int. Cl.
*G01S 5/14* (2006.01)
*G08B 1/08* (2006.01)
*G08B 23/00* (2006.01)
*H04Q 7/00* (2006.01)

(52) U.S. Cl. .......................... 342/357.13; 340/539.13; 340/573.1; 455/456.3; 455/456.5

(58) Field of Classification Search ............... None
See application file for complete search history.

(56) References Cited

U.S. PATENT DOCUMENTS

| | | | |
|---|---|---|---|
| 6,091,956 A * | 7/2000 | Hollenberg | 455/456.5 |
| 6,434,381 B1 * | 8/2002 | Moore et al. | 455/414.3 |
| 6,456,234 B1 * | 9/2002 | Johnson | 342/357.09 |
| 6,529,136 B2 * | 3/2003 | Cao et al. | 340/686.1 |
| 6,549,768 B1 * | 4/2003 | Fraccaroli | 455/456.3 |
| 6,587,835 B1 * | 7/2003 | Treyz et al. | 705/14 |
| 6,618,593 B1 * | 9/2003 | Drutman et al. | 455/456.3 |
| 6,681,114 B2 * | 1/2004 | Chang et al. | 455/456.3 |
| 6,697,842 B1 * | 2/2004 | Smith et al. | 709/206 |
| 6,738,630 B2 * | 5/2004 | Ashmore | 455/456.3 |
| 6,813,501 B2 * | 11/2004 | Kinnunen et al. | 455/456.2 |
| 6,819,919 B1 * | 11/2004 | Tanaka | 455/414.1 |
| 6,842,877 B2 * | 1/2005 | Robarts et al. | 715/708 |

FOREIGN PATENT DOCUMENTS

| | | | | |
|---|---|---|---|---|
| EP | 829704 A | * | 3/1998 |
| WO | WO 9707467 A1 | * | 2/1997 |
| WO | WO 9967765 A | * | 12/1999 |
| WO | WO 200049530 A | * | 8/2000 |
| WO | WO 200167265 A | * | 9/2001 |

\* cited by examiner

*Primary Examiner*—Gregory C. Issing
(74) *Attorney, Agent, or Firm*—Thomas R. Rouse; Bruce W. Greenhaus; Linda G. Gunderson

(57) ABSTRACT

The disclosed system manages information that is received from one or more users over a communication network. A user provides information to the network using a network node, such as a data acquisition device that is a wireless, mobile communication device. The system monitors the user's location within a communication environment and sends an alarm to a user when the user is near a location that satisfies user-specified criteria. The system stores the user-provided information at a central database that is linked to the communication network. When an authorized user revises the information, any other authorized user can access the revised information by accessing the central database through a node of the communication network.

25 Claims, 8 Drawing Sheets

WIRELESS COORDINATION AND MANAGEMENT SYSTEM

RELATED APPLICATIONS

This application is a continuation of U.S. patent application Ser. No. 10/672,824, filed on Apr. 26, 2004 now abandoned, which is a continuation of U.S. patent application Ser. No. 10/011,965, filed on Nov. 5, 2001 now abandoned.

BACKGROUND OF THE INVENTION

1. Field of the Invention

This invention relates generally to information and communication systems and, more particularly, to a wireless communication system for coordinating information and for providing notifications to a user regarding the information.

2. Description of the Related Art

The explosive growth of computers and the Internet has resulted in a vast wealth of information being available to individuals. This has coincided with an increased mobility and pace in everyday life, so that a person can become overwhelmed by an increasing load of information, as well as an increasing number of things to do and places to go. As a result, the ability to efficiently and competently maintain and manage information and tasks can provide a person with a significant edge in society.

There currently exists a variety of devices for storing and managing information such as calendars, to-do lists, and contact lists. The types of devices that can be used to store and manage such information vary widely and include desktop and laptop computers, as well as wireless mobile devices, such as personal digital assistants and mobile telephones. The upside of having so many available devices is that a person has several ways to store information and retrieve information.

However, the downside is that the sheer number of devices ends up adding to the confusion rather than making life easier. It is common for a single person to own a personal computer, a mobile phone, and a personal digital assistant and to use each of the devices to store information. This makes it difficult for a person to keep track of the devices, much less keep track of the information. The problem is even getting worse, as other devices, such as televisions and household appliances, are being equipped with the ability to store information. Coordination of information among the different devices can be a problem.

Another problem is that the devices are passive in that they are generally configured to just store information. For example, a device that is used to store a grocery list generally relies on the user to initiate periodic review of the list and to update the list as items are purchased or as the items need to be added. Thus, the device relies on user initiative in order to be truly helpful. As a result, the users who need the most help—those users who generally need to be reminded to review items on the list—are those who would benefit the least from having such a device.

In view of the foregoing, there is a need for an efficient way of coordinating and managing information among different devices, as well as a way of assisting users in utilizing such information.

SUMMARY OF THE INVENTION

In accordance with the invention, information that is received from one or more users over a communication network is managed even while the user location changes. A user provides information to be managed using any suitable data device communicating with a network node, such as a data acquisition device that is a wireless, mobile communication device. The user's location within a communication environment is monitored and an alarm is sent to a user when the user is near a location that satisfies user-specified criteria. The user-provided information is stored at a central database that is linked to the communication network. When an authorized user revises the information, any other authorized user can access the revised information by accessing the central database through a node of the communication network. Thus, user information may be efficiently managed across different devices and user locations.

The provided information may comprise a list of items that are needed by the user, such as a grocery list, a gift list, or a food list. The location of the user in the communication environment is tracked by monitoring the location of the data acquisition device, which can be a mobile phone that is carried by the user. A message is sent to the mobile phone when the user is at or near a location where the user can obtain an item from the list of items needed. For example, when the user is near a store that sells an item on the user's grocery list, a notification is sent to the user regarding the user's proximity to the store and reminding the user that the store sells an item on the grocery list.

Other features and advantages of the present invention should be apparent from the following description of the preferred embodiment, which illustrates, by way of example, the principles of the invention.

DETAILED DESCRIPTION

Figure 1:
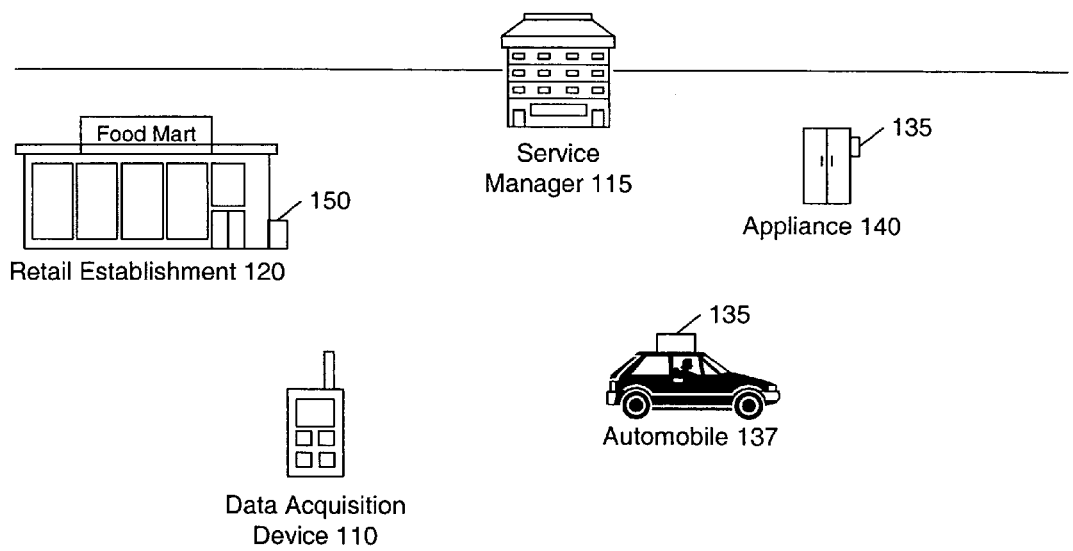
FIG. 1 is a block diagram of a communication environment in which are disposed several nodes of a communication network.

In accordance with the invention, a variety of network communication devices communicate over a network and are housed in various host systems or locations, thereby comprising nodes of a network. FIG. 1 is a block diagram of a communication environment 100 in which are disposed several nodes of a communication network 102 (shown in FIG. 2), including a data acquisition device 110, service manager 115, retail establishment 120, and extraterrestrial global positioning system (GPS) satellites 130. A wide variety of other devices may be communicatively linked to the communication network 102 via host systems. For example, an automobile 137 may host a communication device 135 and an appliance 140 may host a communication device 135, as described further below. Thus, the satellites 130, data acquisition device 110, retail establishment 120, and various communication devices 135 communicate with each other over the communication network 102 and comprise nodes of the network.

For clarity of illustration, FIG. 1 schematically shows the communication devices 135 as being externally attached to their respective host systems, although it should be appreciated that the communication devices 135 may be coupled to their respective host systems in a wide variety of ways. Furthermore, although FIG. 1 only shows a single instance of some nodes such as a single appliance and a single automobile, the communication environment 100 can include multiple instances of each node.

The disclosed system manages the provision and access of information between two or more nodes of the communication network 102. The service manager 115 monitors a user's location within the communication environment 100 and sends update messages to the user when the user's location is near a location that satisfies user-specified criteria. The user can provide information to be managed using any of the nodes of the communication network 102. The service manager 115 also stores the information at a central database that is linked to the communication network 102, as described in further detail below.

The data acquisition device 110 is a remote, wireless communication device that is capable of communicating with the service manager 115 over the network 102. The data acquisition device 110 is preferably a hand-held mobile computer device, such as wireless telephone or a personal digital assistant. The data acquisition device 110 is configured to receive data from the user. The data acquisition device 110 can upload the received data to the communication network 102 for storage at a central database.

The data acquisition device 110 is preferably movable throughout the communication environment 100 such that the location of the data acquisition device 110 can change with respect to the location of any of the nodes. The GPS satellites 130 can be used to determine the location of the data acquisition device 110 within the communication environment 100, as well as the location of other objects within the communication environment, as described below.

The service manager 115 is any device that is capable of sending and receiving data transmissions to and from the data acquisition device 110 or any of the other nodes of the network 102. The service manager performs the data management functions, as described further below. The service manager 115 may be operated by a service provider that provides services according to the methods described herein. For example, the service manager 115 may be operated by a telephone company that provides wired or wireless telephone and other network services to the nodes of the communication network. The service manager 115 may also be operated by an Internet service provider.

The communication device 135 is a device that is configured to establish a communication link with the network 102 for the exchange of data, such as through a wired or wireless modem. A communication device 135 can communicate with the network 102 using any of a wide variety of communication protocols. Preferably, the communication device 135 includes a user interface and memory that enables a user to input and store data, as described below.

As mentioned, the communication device 135 can be coupled to any of a wide variety of host devices to thereby render the host device a node of the communication network 102. The communication device 135 is configured to receive data from the user. The communication device 135 can establish a connection with the network 102, such as a wireless or wired connection, and upload received data to the network 102. The communication device 135 differs from the data acquisition device 110 in that the communication device 135 resides with and is associated with a host device, such as an automobile or an appliance. On the other hand, the data acquisition device 110 is an independent handheld communication device, such as a mobile phone or personal digital assistant.

FIG. 1 shows a first communication device 135 coupled to an automobile 137 and a second communication device 135 coupled to an appliance 140. In this manner, the automobile 137 and appliance 140 are effectively rendered nodes of the communication network 102. An appliance 140 is any instrument that is configured to perform a task or function or assist the user in performing a task or function. An appliance 140 can comprise a common household appliance or office appliance, such as, for example, a refrigerator, washer, dryer, personal computer, etc.

A retail communication device 150 is a communication device 135 that is coupled to the retail establishment 120 to thereby communicatively link the retail establishment 120 to the network 102. The retail communication device 150 is a computing device that is configured to transmit data over the communication network 102 and receive data from the communication network 102. The retail communication device 150 can also receive data from a user. The retail communication device 150 is preferably fixedly located at the retail establishment 120. The retail communication device 150 may have the same construction as the communication device 135 or may have additional components that are particularly suited for use in the retail establishment.

The retail establishment 120 is representative of any entity or party that provides goods and/or services within the communication environment 100, whether or not for monetary compensation. The retail establishment 120 includes any type of goods or service provider as well as the structure in which such a provider is located. Thus, the retail establishment 120 can include a grocery store, a convenience store, a restaurant, a gas station, or any other type of store. Typically, the retail establishment 120 is disposed at a stationary location within the communication environment 100, although the retail establishment 120 may also be mobile.

Figure 2:
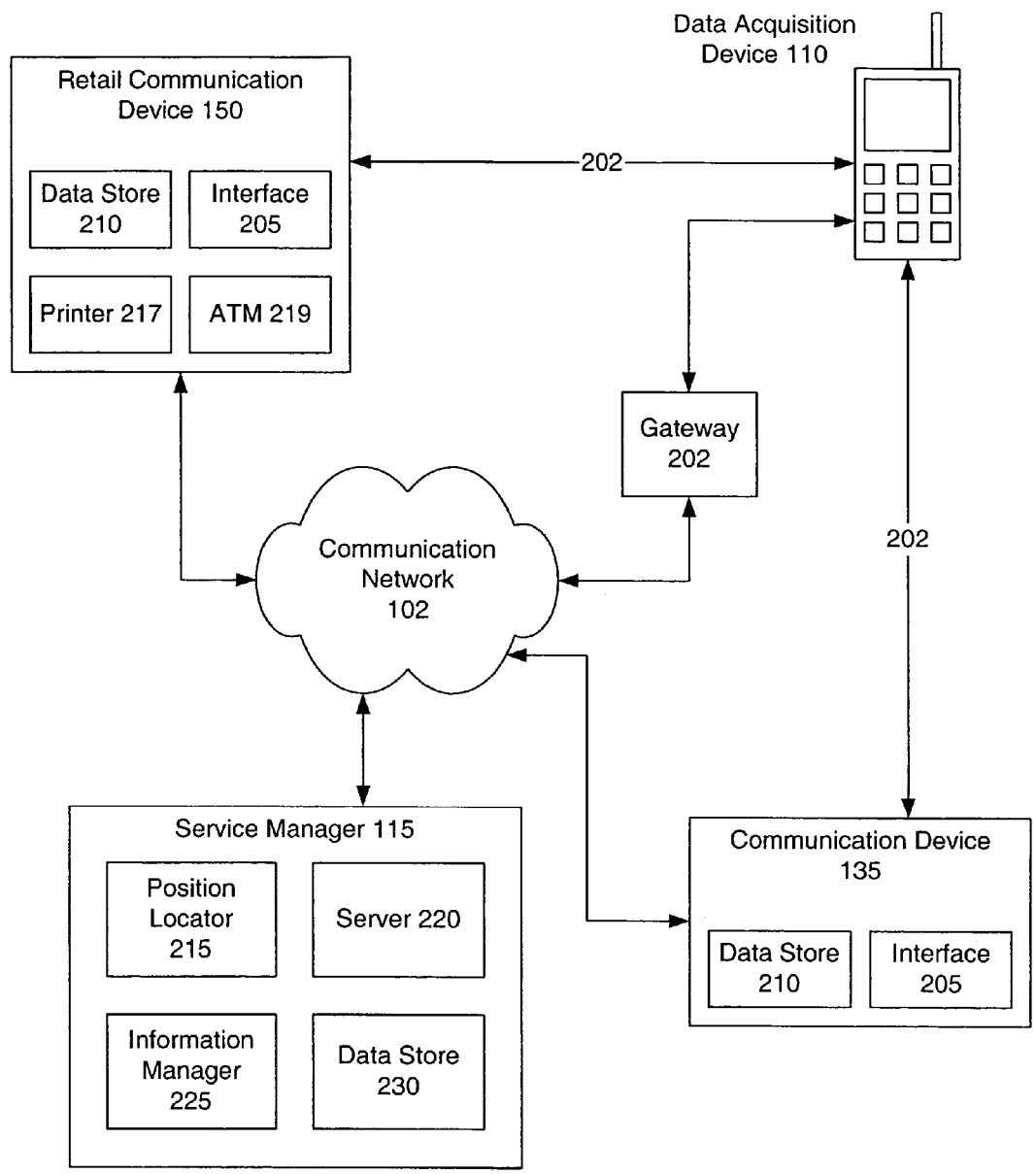
FIG. 2 is a block diagram of some of the nodes of the communication network.

FIG. 2 is a block diagram that illustrates nodes comprised of various devices that are communicatively linked to the communication network 102, including the data acquisition device 110, retail communication device 150, service manager 115, and communication device 135. Each of the devices are preferably configured to store and retrieve data within internal memory according to well-known devices and methods. FIG. 2 shows only a single communication device 135 linked to the network 102. However, the network 102 may include several communication devices 135, each of which is coupled to a respective host device, such as an automobile 137 or an appliance 140, as shown in FIG. 1.

The communication network 102 can be one or more terrestrial or extraterrestrial networks configured to transport data, as well as a combination of terrestrial and extraterrestrial networks. The communication network 102 can include a common or private telecommunications network such as a public switched telephone network (PSTN), a local area network (LAN), a wide area network (WAN), a cable-based telecommunication network, a cellular network, a Personal Communications System (PCS), an extraterrestrial satellite system, as well as combinations thereof or any other wired and/or wireless means of transporting data. The communication network 102 may be coupled with or overlaid by a TCP/IP network, such as the Internet or an intranet.

The data acquisition device 110 generally communicates with the network 102 by establishing a wireless connection with a gateway 202, which is communicatively linked to the communication network 102. The gateway 202 may be a base station or a cell of the type associated with mobile phone services. The gateway 202 may also be some other type of wireless connection through which the data acquisition device 110 can gain access to the communication network 102. The gateway may be operated by a telephone service provider or an Internet service provider to thereby provide such services to the data acquisition device 110. There may be multiple gateways disposed throughout the communication environment 100.

The data acquisition device 110 can preferably also establish a direct communication link with any of the nodes, such as with the retail communication device 150 or communication device 135, as illustrated by the two-way connections 202 in FIG. 2. In this regard, the communication devices 135 or 150 may be equipped with a docking station that enables the data acquisition device 110 to dock and exchange data with the communication device 135. The connection 202 may be wired or wireless according to any of a wide variety of communication protocols, including Bluetooth, IEEE 802.11x, UltraWideband, or any other communication protocol.

The communication device 135 and the retail communication device 150 may optionally both include a user interface 205 that allows a user to provide data, which can be stored locally in a respective data store 210. The user interface 205 can comprise any means of entering data, such as a keyboard or a mouse. The user interface 205 can also include software that is configured to assist a user in entering data. The communication device 135 and retail communication device 150 can also include display screens.

The retail communication device 150 can optionally be coupled to a printer 217 to allow a user to print out data that is accessed from the retail communication device 150. The retail communication device 150 can also be coupled to other peripheral devices that are associated with the retail establishment 120, such as an automated teller machine (ATM) 219.

The service manager 115 includes applications that may be realized using software, hardware or combinations of software and hardware. The applications include a position locator 215 and an information manager 225. The service manager 115 also includes a server 220, which is software and/or hardware that enables the position locator 215 and information manager 225 to send and receive data to and from the nodes of the communication network 102. The position locator 215, server 220, and information manager 225 need not be incorporated into the service manager 115, but can rather reside at one or more separate nodes of the communication network 102 apart from the service manager 115. Thus, the position locator 215 and the information manager 225 can reside at separate locations or at the same network location. For example, the position locator 215 can reside in the data acquisition device 110 so that the data acquisition device can calculate its location and send information regarding its location to the service manager 115. The functionality of the position locator 215, information manager 225, and server 220 can also be incorporated into a single application executing at the same location.

The position locator 215 is configured to determine the location of the data acquisition device 110 using GPS information that is obtained from one or more of the GPS satellites 130 (FIG. 1). The location of a device 110, 135 can be determined using any of a wide variety of methods and devices, such as according to the methods described in U.S. Pat. No. 6,188,354, entitled "Method and Apparatus for Determining the Location of a Remote Station in a CDMA Communication Network" and U.S. Pat. No. 6,081,229 entitled "System and Method for Determining the Position of a Wireless CDMA Transceiver," which are both incorporated herein by reference.

The information manager 225 is configured to store and maintain data received from any of the nodes of the communication network 102, such as from the data acquisition device 110, communication device 135, or retail communication device 150, as well as location data from the position locator 215. The information manager 225 can also transmit data and alarms to any of the nodes of the communication network 102.

The information manager 225 preferably maintains a data store 230 that functions as a central data repository for data access among nodes of the communication network 102. One or more users can establish an account with the service provider that operates the information manager 225 to store and manage data in the data store 230 in exchange for a fee. For example, a telephone and/or Internet service provider may operate the information manager 225 and provide telephone services to a user (and access to the network 102) as well as services under the information manager 225. The information manager 225 may also be operated by an independent service provider that contracts with the operator of the gateway 202 to provide services to customers of the gateway operator.

Data Management

The data acquisition device 110 is configured to receive and store data provided directly by a user, such as through a keypad, or through a data port, such as a peer-to-peer connection to a data source. The communication device 135 and retail communication device 150 can also receive data directly from a user if they are equipped with a user interface such as a keypad or data port. When data is received, the device preferably transfers the data via the communication network 102 to the information manager 225, which stores the data in the central data store 230. The information manager 225 makes the data available to authorized users that have access to a node of the computer network 102. The information manager 225 dynamically updates the data in the data store 230 when an authorized user revises the data via a node of the communication network 102. This process is described in more detail with respect to FIG. 3, which shows a flow diagram that describes the operations involved in obtaining and updating data.

Figure 3:
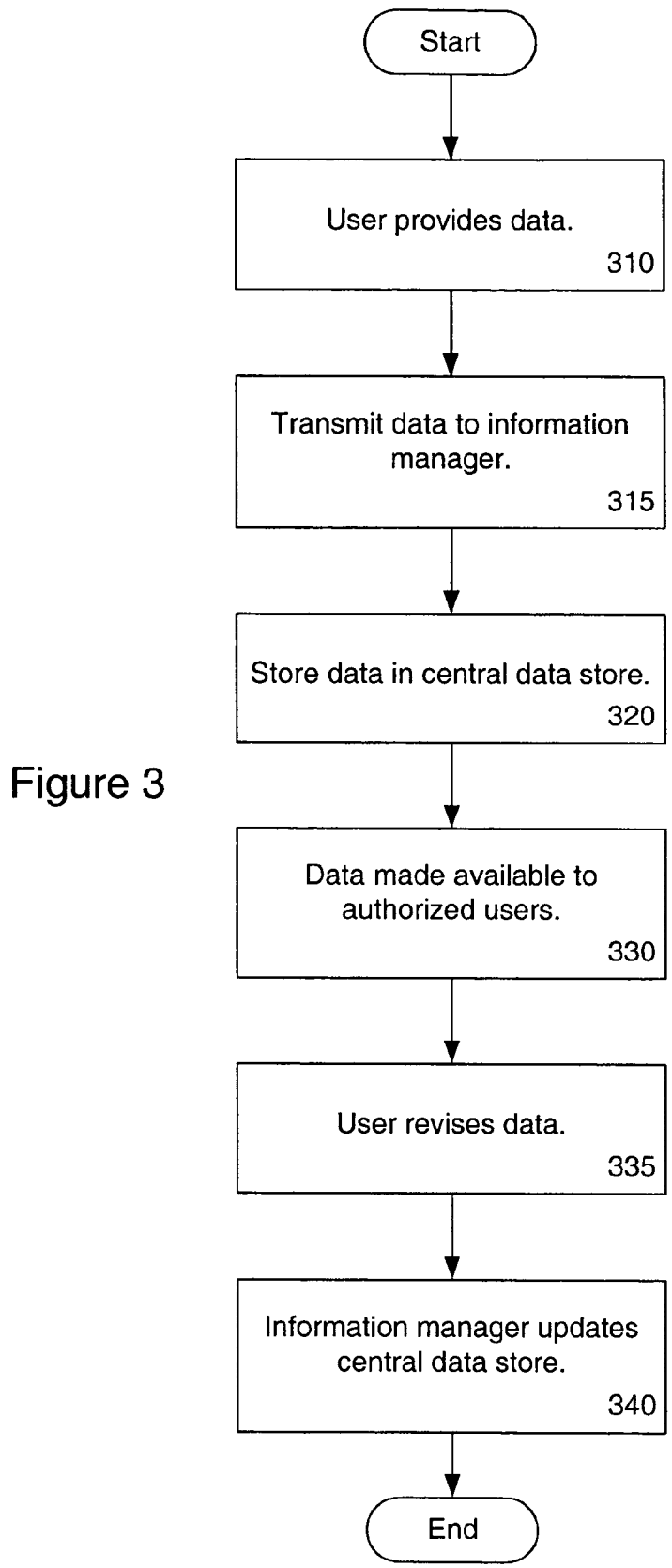
FIG. 3 is a flow diagram that illustrates the operations performed in obtaining and coordinating data among the nodes of the communication network.

In the first operation, represented by the flow diagram box numbered 310 in FIG. 3, the user provides data either to the data acquisition device 110 or to another node of the communication network 102. In the case of the data acquisition device 110, the user preferably provides data using data entry means, such as an alphanumeric keypad on the data acquisition device 110. The data acquisition device 110 can also be equipped with voice recognition software or hardware for user entry of data. The data acquisition device 110 preferably is equipped with user interface software and a display that facilitates the entry of data. A user could also provide data to a node using a communication device 135 that is coupled to an appliance 140 or an automobile 137. A user can also provide data using a retail communication device 150. The respective device in which data was provided preferably stores the data in local memory.

The data provided by the user in the first operation 310 can be in any of a wide variety of formats and can relate to any of a wide variety of subjects, including to-do lists, instructions, calendars appointments, reminders, notices, etc. In one embodiment, the user provides data to the data acquisition device 110 wherein the data comprises a list of items that the user desires to obtain, such as a grocery list, a gift list, or a food list. The list items preferably include at least one item that can be obtained at a retail establishment 120 in the communication environment 100 (FIG. 1).

Figures 4, 5, 6:
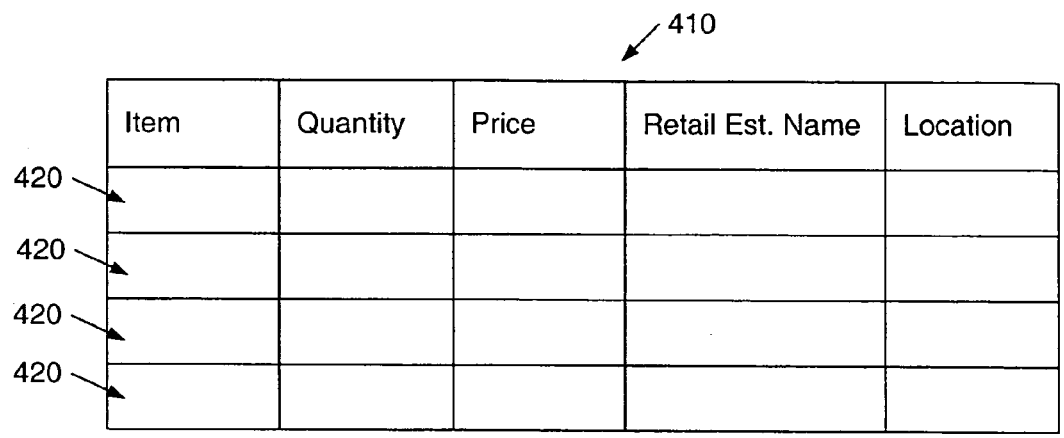
FIG. 4 is an illustration of an exemplary data structure.
FIG. 5 is another illustration of an exemplary data structure.
FIG. 6 is another illustration of an exemplary data structure.

With reference to FIG. 4, the list can be stored as a data structure comprised of a table 410 that includes one or more elements 420, each element corresponding to an item in the list. Each element includes one or more data slots that contain data that is related to or descriptive of the corresponding item. The data slots can include, for example, item name, quantity of items needed, desired price, or any other information regarding the item. Preferably, there is also a data slot that contains the name of at least one retail establishment where the user prefers to obtain the item and/or a data slot that specifies one or more locations for the retail establishment. The retail establishment name and location can be specified using a code.

The table 410 is merely exemplary and it should be appreciated that the data structure could be in a different format or could include more or less of the data slots shown. For example, as shown in FIG. 5, a data element might only include data slots for item name, quantity, retail establishment name, and retail establishment location. Alternately, as shown in FIG. 6, a data element might only include data slots for item name, desired price range, and preferred retail establishment.

The data provided by the user in the first operation 310 may also comprise data provided using a communication device 135, such as data provided using the interface 205 (FIG. 2). In this manner, the user can enter data directly into an appliance 140, automobile 137, or any other device that is coupled to a communication device 135. For example, the appliance 140 can be a refrigerator that has a communication device 135 with a data entry keypad located on the refrigerator door. The refrigerator, via the attached communication device 135, transfers user-provided data to the data acquisition device 110 or to the information manager 225 over the network 102. In another example the appliance 140 is a desktop computer into which the user enters data. The desktop computer can then transmit the data over the network 102 to the information manager 225 or directly to the data acquisition device 110.

The data provided by the user in the first operation 310 may also comprise data provided using the retail communication device 150. In this case, the user may be a representative of the retail establishment 120 or a customer of the retail establishment. The retail communication device 150 can be configured to receive and transmit data related to the retail establishment, such as data that relates to the name of the retail establishment, which can correspond to the name (s) in the lists shown in FIGS. 4–6. The data could also be descriptive of the location and operating hours of the retail establishment 120. The data can also be descriptive of items that are available at the retail establishment, such as item names, prices, discounts, quantity in inventory, etc.

With reference again to FIG. 3, the next operation is represented by the flow diagram box numbered 315. In this operation, the node that received the data transmits the data to the information manager 225 over the network 102. For example, the data acquisition device 110, communication device 135, or retail communication device 150 may transmit received data to the information manager via the network 102. The data may be transmitted automatically when received. The data may also be transmitted when the user selects a "transmit" key. The data may also be transmitted upon occurrence of a predetermined event, such as whenever a predetermined time period elapses or when a device is powered on.

In the next operation, represented by the flow diagram box numbered 320, the information manager 225 stores the received data in the data store 230. The information manager 225 preferably maintains a list of access rights descriptive of users that are authorized to access the data. The access rights are preferably defined by a user when the user establishes an account with the information manager 225 and specifies other users that are to be granted access to data associated with the account. An account can be associated with one or more users, with each user having a set of access and revision rights related to data in the account. For example, the account may be associated with a family comprised of several users, with some of the users having access to all of the data and other users having access to only a subset of the data. A user can also specify that third parties, such as retail establishments, could have limited access to some of the data in the user's account.

In the next operation, represented by the flow diagram box numbered 330, the information manager makes the data available to authorized users. An authorized user can preferably access the data using any of the nodes of the computer network 102, which are configured to download the data over the network 102. For example, the user can access the data using the data acquisition device 110 by causing the device 110 to connect to the network 102. When the user attempts to access a particular data structure, the data acquisition device 110 preferably establishes a connection with the information manager 225 and requests a copy of the data, such as a copy of a to-do list. Advantageously, any authorized user can access the data anywhere in the communication environment 100 using a data acquisition device 110 and by providing proper access validation, such as a username and password. When accessed, the user can view the data on a display screen or by printing a hard copy.

In the next operation, a user makes a revision to data in the user's account, as represented by the flow diagram box numbered 335. The revision can include any change to the data by an authorized user, such as the user adding a new item to a list or deleting an item from a list. When a revision is made, the data acquisition device 110 (or whatever node the user accessed to revise the data) notifies the information manager 225 of the revision. The information manager 225 then updates the corresponding data in the data store 230 accordingly, as represented by the flow diagram box numbered 340. In this manner, data revisions are dynamically reflected in the central data store 230, where the revised data may be accessed by authorized users.

Data revisions can also occur with respect to a retail establishment 120. A representative of a retail establishment 120 can revise retail establishment data, such as to update locations of retail establishments or to update data related to items that are available from the retail establishment.

In one embodiment, an appliance 140 is configured to make automatic adjustments to data based upon conditions related to the appliance. For example, if the appliance 140 is a refrigerator, the appliance can detect when certain refrigerated items are out of stock, such as if the refrigerator is out of eggs. The appliance can be equipped with a detector (such as a weight detector) that detects when eggs (or any other item) are present or when eggs are not present in an assigned location of the refrigerator. When a particular item is not present, the appliance 140 (via the communication device 135) can update the appropriate data in the user account, such as by adding an item to a grocery list. A user of the data acquisition device 110 can access the updated data by accessing the central data store 230 using a node of the network 102.

The process shown in the diagram of FIG. 3 enables a user or a group of users to provide and store data that is made available to authorized users. Revisions to the data are dynamically updated in the central data store 230, so that authorized users have access to the revisions anywhere in the communication environment as long as the user has access to a node of the communication network 102. This advantageously enables a user to use a plurality of devices to enter and retrieve data while the information manager 225 stores the data at the central data store and makes the data available to the different devices. In this manner, the devices have access to consistent data.

Notification Based on Proximity to Retail Establishment

As mentioned, a user can use the data acquisition device 110 to store information including a list of needed items, such as a grocery list. The communication system keeps track of the user's location within the communication environment and notifies the user when the user is near a location where the user can obtain an item on the list, such as when the user is near a retail establishment 120. This process is described with respect to the flow diagram shown in FIG. 7.

In the first operation, represented by the flow diagram box numbered 710, the position locator 215 determines the location of the user by determining the location of the data acquisition device 110 and provides information regarding the location to the information manager 225. As mentioned, the user preferably carries the data acquisition device 110 at his or her side, so that the location of the data acquisition device 110 is effectively the same as the location of the user. The location of the data acquisition device 110 can be specified as an absolute position, such as a latitude and longitude. The location can also be specified as a relative position with respect to some object in the communication environment.

The position locator 215 can determine the location of the data acquisition device by coordinating with the data acquisition device 110, the GPS satellites 130 and the service manager 115 according to the systems and methods described in U.S. Pat. No. 6,081,229 entitled "System and Method for Determining the Position of a Wireless CDMA Transceiver" and U.S. Pat. No. 6,188,354, entitled "Method and Apparatus for Determining the Location of a Remote Station in a CDMA Communication Network." The position locator 215 doesn't necessarily calculate the location of the data acquisition device 110 itself. It may receive the location from another device or application that performed the actual calculations. The position locator 215 can also do the calculations itself. As mentioned, the position locator 215 can reside in the data acquisition device 110 thereby enabling the data acquisition device to determine its location and send location information to the service manager 115.

The position locator 215 can determine the location of the data acquisition device 110 periodically, so that the location is being monitored on a regular basis. The position locator 215 can also determine the location upon the occurrence of certain events, such as when the user requests a location determination or when the user powers on the data acquisition device 110. The position locator 215 preferably communicates the location of the data acquisition device to the information manager 225.

In the next operation, the information manager 225 determines whether the data acquisition device 110 is near a qualified retail establishment using the location information provided by the position locator 215. This is represented by the decision box numbered 720. A "qualified retail establishment" is a retail establishment 120 that satisfies certain criteria, the criteria being specified in data that was provided by a user and that is stored in the central data store 230 or at the data acquisition device 110. In one embodiment, the criteria is specified in an items-needed list associated with the user's account, such as the lists is shown in FIGS. 4–6. The criteria corresponds to the information in the data slots of the list. For example, a first criteria can be whether the retail establishment stocks at least one of the items named in the list. Thus, if a retail establishment stocks an item on the list, the retail establishment satisfies the criteria and is therefore a qualified retail establishment.

There could also be other criteria, including whether the retail establishment 120 stocks an item that conforms to other user-specified requirements in the list, such as whether the item is within a specified price range, whether the item is actually in stock or whether a minimum quantity of the item is in stock. Another criteria can be the name of the retail establishment so that only retail establishments having a certain name can be classified as a qualified retail establishment. Other criteria may be accepted modes of payment or affiliations. With affiliations as criteria, the group of "qualified" retail establishments can be limited to those retail establishments that pay a fee to be a member of an authorized criteria list, thereby limiting the establishments for which the user will receive notifications. The user can also specify as criteria a specific location or range of locations, so that only retail establishments at the specified location(s) can qualify. The information manager 225 classifies only those retail establishments that satisfy some or all of the specified criteria as a qualified retail establishment.

The information manager 225 can compile a list of qualified retail establishments by consulting data that is available in the data store 230. The information manager 225 can compare the criteria in the items-needed list of the user's account with available data on retail establishments 120 to determine if any retail establishments are qualified retail establishments. Based upon the comparison, those retail establishments that have data that meets the criteria are then added to the list of qualified retail establishments. As discussed above, a retail establishment 120 provides data to the information manager 225 regarding the items available at the retail establishment 120, as well as data that is descriptive of the name and location of the retail establishment.

With reference still to the operation shown in the decision box numbered 720, the information manager 225 compares the location of the data acquisition device 110 to known locations of qualified retail establishments to determine whether the data acquisition device is "near" the location of a qualified retail establishment. The data acquisition device 110 is "near" a qualified retail establishment when the location of the data acquisition device relative to the location of the qualified retail establishment satisfies a condition related to the relative locations of the qualified retail establishment and the data acquisition device 110. The condition can vary and could be specified by the user. For example, the condition can be that the distance between the two locations is less than a predetermined distance.

Figure 8:
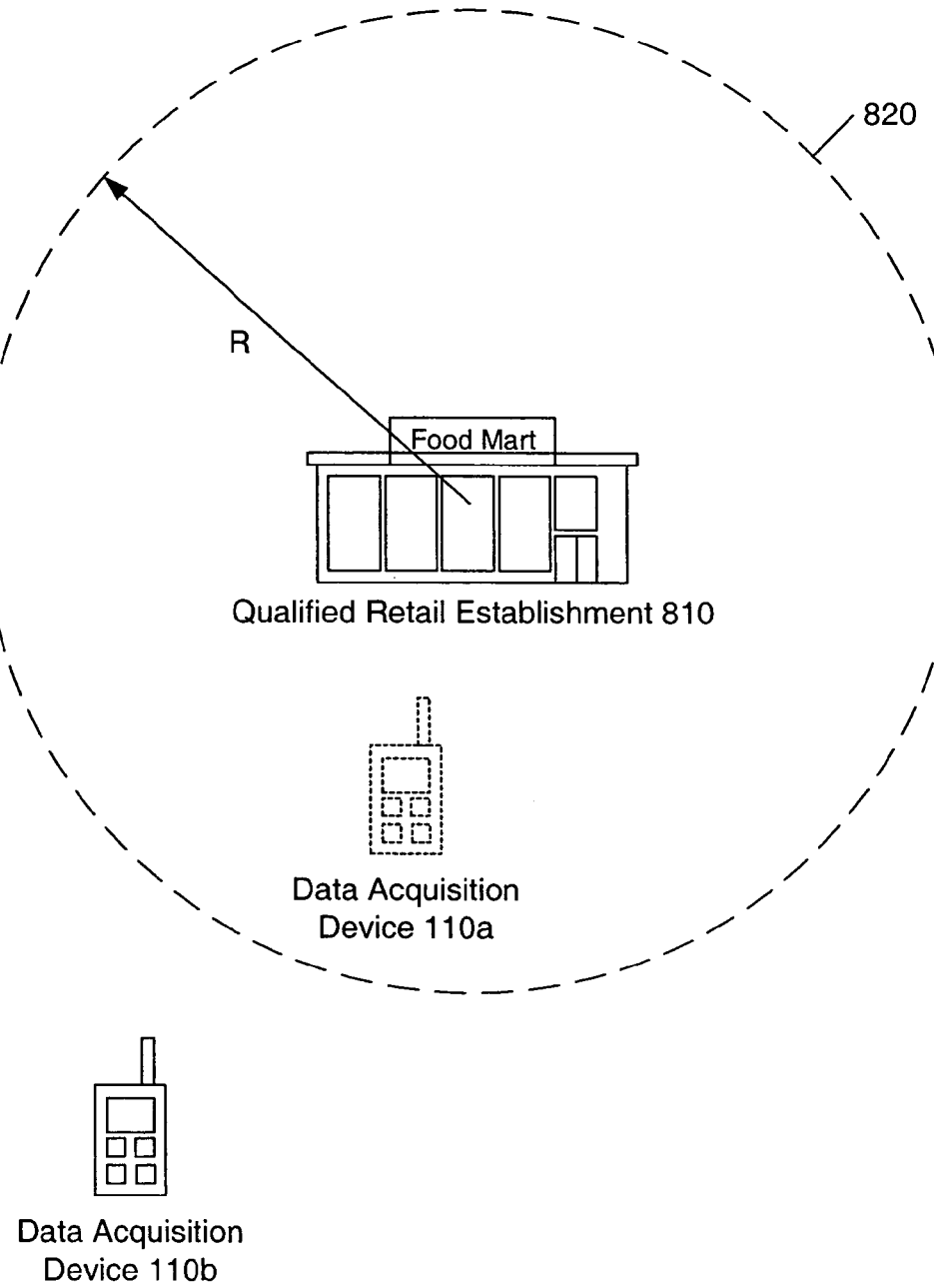
FIG. 8 is a block diagram of a communication environment that includes a remote communication device and a retail establishment.

In one embodiment, the data acquisition device is near the location of a qualified retail establishment when the absolute location of the data acquisition device is within a predetermined distance of the absolute location of the qualified retail establishment. This is illustrated in FIG. 8, which shows a qualified retail establishment 810 and a circle 820 that defines locations within a predetermined distance R from the qualified retail establishment 810.

The first data acquisition device 110a (shown in phantom lines) would qualify as being near the qualified retail establishment 810 because it is within the circle 820 and, therefore, within the predetermined distance R of the qualified retail establishment 810. However, the second data acquisition device 110b does not qualify as being near the qualified retail establishment 810 because it is outside the circle 820 and, therefore, farther from the qualified retail establishment 810 than the predetermined distance.

Other conditions can also be used to determine whether the data acquisition device 110 is near a location, such as whether the data acquisition device 110 is on a common street as the location. The information manager 225 can take other factors into consideration, such as the location of known obstacles, such as hills and traffic signals, with respect to the user location.

Figure 7:
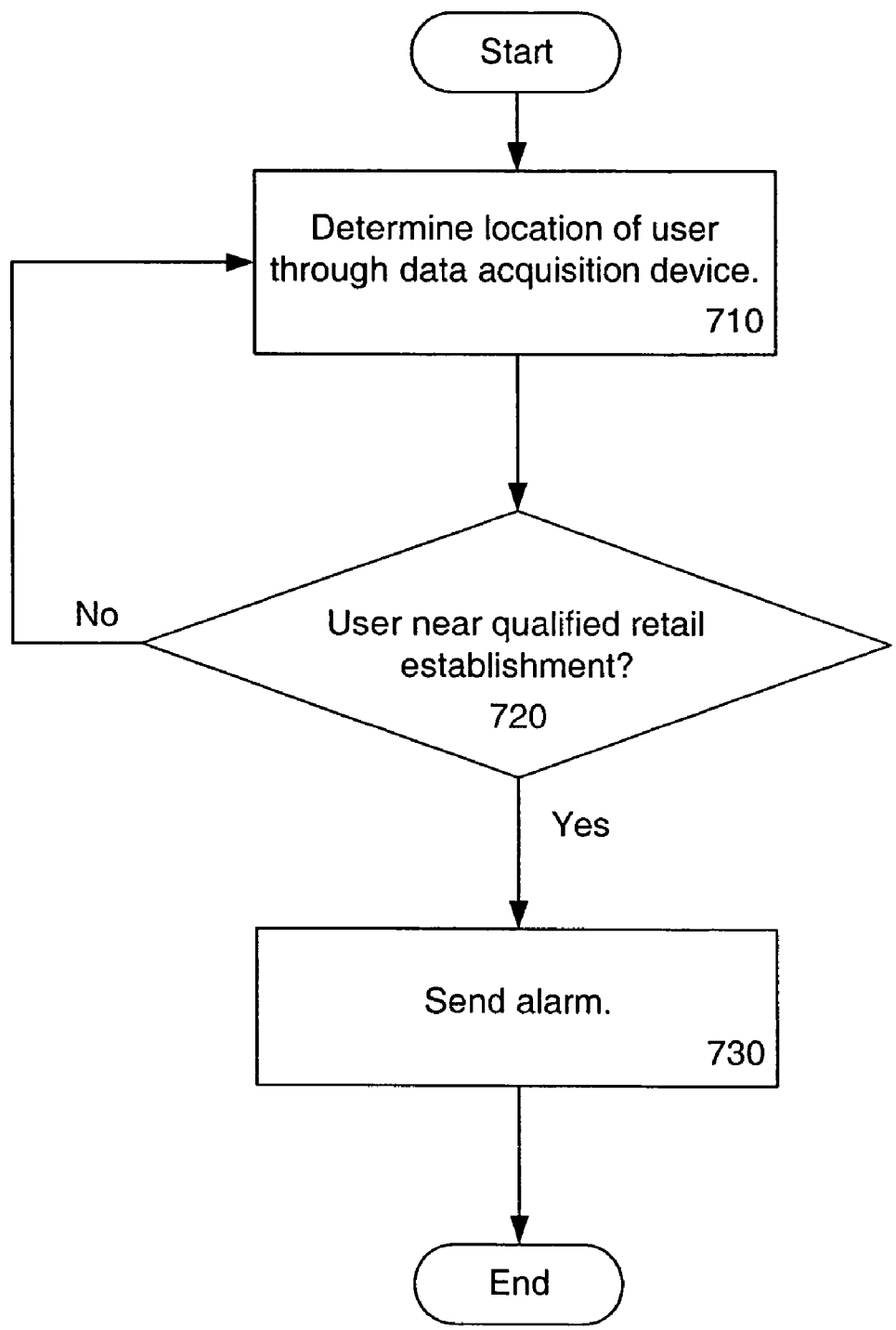
FIG. 7 is a flow diagram that illustrates the operations performed in notifying a user when the user is near a location that meets criteria specified in data of the communication network.

If the information manager 225 determines that the data acquisition device is not near a qualified retail establishment, then a "No" outcome will result from the decision box numbered 720 of FIG. 7. In such a case, the location of the data acquisition device 110 is preferably determined periodically for proximity to qualified retail establishments.

If the information manager 225 determines that the data acquisition device is indeed near a qualified retail establishment (a "Yes" outcome from the decision box 720), then the information manager 225 preferably causes an alarm to be sent to the data acquisition device 110 over the communication network 102. The alarm can be an active alarm, such as causing the data acquisition device to emit an audible notice, such as a beep. The alarm is preferably accompanied by a message that contains text, wherein the text notifies the user that he or she is near a retail establishment that provides an item on the list. Alternately, the alarm can be a notice that requests the user to call a message center or to check e-mail for further information.

The user can then visit the qualified retail establishment and obtain the item. Advantageously, once the user is at the retail establishment, the user can access an updated version of the items-need list in a variety of manners. The user can access the list on the data acquisition device 110 by causing the device to establish a link with the information manager 225 and download the updated list. The user can also access the list using the retail establishment communication device 150, if one is available. The retail establishment will preferably include a printer attached to the device 150, so the user can print out the list. When the item is obtained from the retail establishment, the user can then delete the item from the list using the data acquisition device 110 or device 150, which will then update the information manager 225 regarding any changes.

Figure 9:
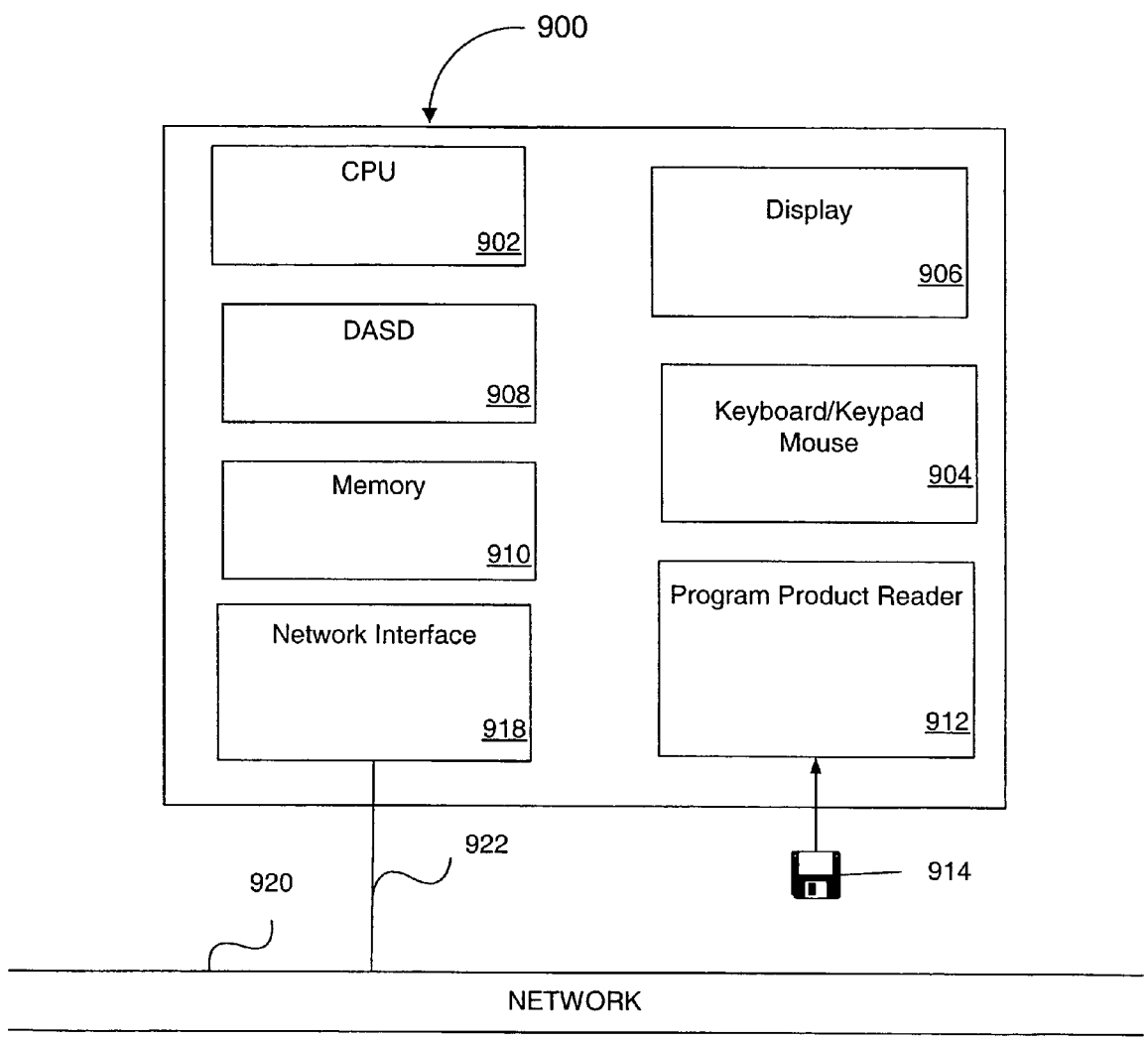
FIG. 9 is a block diagram of a device comprised of a node of the communication network illustrated in FIG. 1, illustrating the hardware components.

FIG. 9 is a block diagram of an exemplary communication device 900 such as might comprise one or more of the nodes of the network 102, such as the service manager 115. The communication device 900 can include some or all of the components illustrated, as well as different versions of the components that are suited for the type of device. For example, if the communication device is a desktop computer, then it may include all of the components. However, if the communication device 900 is a mobile communication device then it may include only those components that are suited for a handheld device.

The communication device 900 operates at least partially under control of a central processor unit (CPU) 902. The CPU may be, for example, a "Pentium" microprocessor and associated integrated circuit chips, available from Intel Corporation of Santa Clara, Calif., USA. The CPU may also be a microprocessor that is configured for a handheld device such as a mobile phone or personal digital assistant. A user can input commands and data from data entry device, such as a keypad, keyboard and/or computer mouse 904. The user can view inputs and computer output at a display 906. The display can be, for example, a video monitor, flat panel display or liquid crystal display.

The communication device 900 can also include a direct access storage device (DASD) 908, such as a hard disk drive. The memory 910 typically comprises volatile semiconductor random access memory (RAM). The device 900 can includes a program product reader 912 that accepts a program product storage device 914, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

The communication device 900 can communicate over a communication network 920 through a network interface 918 that enables communication over a connection 922 between the network 920 and the communication device 900. The network connection 922 can be wired or wireless. The network interface 918 typically comprises, for example, a Network Interface Card (NIC) that permits communications over a variety of networks. The network interface 918 can also include one or more antennas.

The CPU 902 operates under control of programming steps that are temporarily stored in the memory 910 of the communication device 900. When the programming steps are executed, the computer performs its functions. Thus, the programming steps implement the functionality of the processes described herein such as the functions of the service manager 115. The programming steps can be received from the DASD 908, through the program product storage device 914, or through the network connection 920. The program product storage drive 912 can receive a program product 914, read programming steps recorded thereon, and transfer the programming steps into the memory 910 for execution by the CPU 902. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 910 over the network 920. In the network method, the computer receives data including program steps into the memory 910 through the network interface 918 after network communication has been established over the network connection 922 by well-known methods that will be understood by those skilled in the art without further explanation. The program steps are then executed by the CPU.

Any of the nodes of the computer network can have an alternative construction that supports the functionality described herein.

Figure 10:
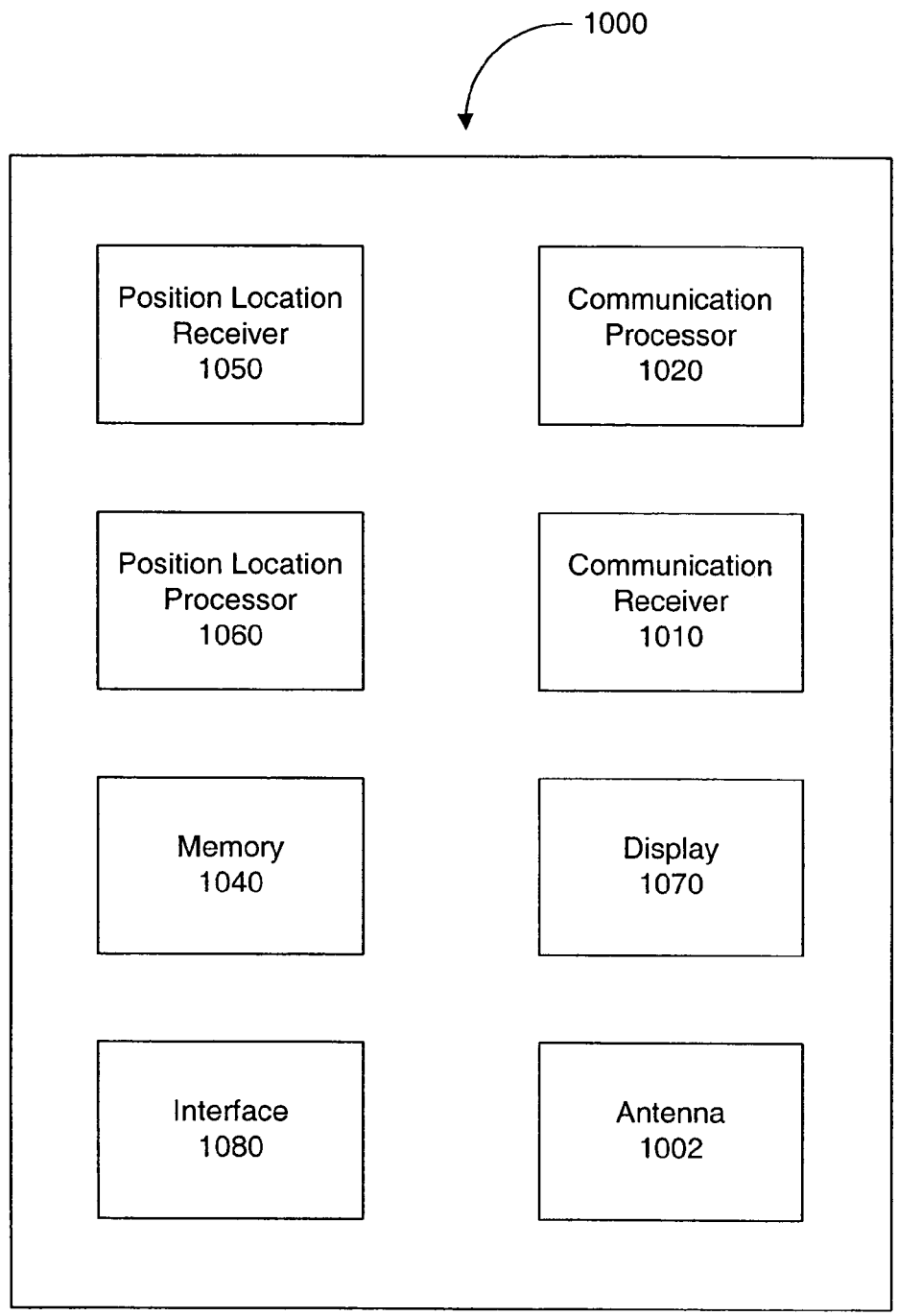
FIG. 10 is a block diagram of a device that comprises a wireless node of the communication network illustrated in FIG. 1, illustrating the hardware components.

FIG. 10 is a block diagram of an exemplary wireless device 1000 such as might comprise one or more of the nodes of the network 102, such as the data acquisition device 110 or communication device 135. The wireless device 100 includes an antenna 1002 that is configured to receive communication signals, such as from a GPS satellite or from a base station. The antenna communicates with a communication receiver 1010 that performs any necessary radio frequency processing, such as such as filtering, down converting, amplification, etc. Such radio frequency processing is well known to those of skill in the art.

The wireless device 1000 also includes a communication processor 1020 that communicates with the communication receiver 1010. The communication processor 1020 extracts from received signals information regarding the orbits of the satellites 130. Extraction of such information is well known to those of ordinary skill in the art. The information may be stored in memory 1040 of the wireless device 1000.

The wireless device 1000 also includes a position location receiver 1050 that is coupled to the antenna 1002. The position location receiver 1050 performs any front end radio frequency processing of position location signals received from a base station or satellite. The position location receiver 1050 is also coupled to a position location processor 1060 that determines the distance to satellites, according to methods that are well known to those of ordinary skill in the art. The position location processor 1060 also determines its own position using the locations of satellites.

The wireless device 1000 preferably also includes a display 1070 that is sized for a handheld device, and an interface 1080, such as a keypad. The display 1070 and interface 1080 allow a user to enter and view data.

The present invention has been described above in terms of a presently preferred embodiment so that an understanding of the present invention can be conveyed. There are, however, many configurations for the system not specifically described herein but with which the present invention is applicable. The present invention should therefore not be seen as limited to the particular embodiment described herein, but rather, it should be understood that the present invention has wide applicability with respect to information and communication systems generally. All modifications, variations, or equivalent arrangements and implementations that are within the scope of the attached claims should therefore be considered within the scope of the invention.

The invention claimed is:

1. A method of managing information received from at least one user over a communication network, comprising:
receiving information from a first authorized user, wherein the information indicates user-specified criteria related to a location at which the user-specified criteria can be met, wherein the information includes an items needed list of at least one item, and wherein at least one user-specified criterion is whether an item on the items needed list can be obtained at an establishment;
storing the information at a central database that is linked to the communication network;
receiving from at least one of the first authorized user and a second authorized user, modifications to the user-specified criteria;
monitoring the second authorized user's location; and
sending a notification to at least one of the first authorized user and the second authorized user when the second authorized user is located near an establishment at which the second authorized user can obtain an item on the items needed list.

2. A method as defined in claim 1, wherein the first authorized user sends the information via a wireless data acquisition device.

3. A method as defined in claim 2, wherein the data acquisition device is a mobile phone.

4. A method as defined in claim 1, wherein an additional criterion describes a geographic location of an establishment, and additionally comprising:
sending a notification to at least one of the first authorized user and the second authorized user when the second authorized user is located near an establishment that is located at the geographic location described in the additional criterion.

5. A method as defined in claim 1, wherein monitoring the second authorized user's location comprises monitoring the location of a data acquisition device associated with the second authorized user.

6. A method as defined in claim 1, wherein the second authorized user is near the establishment that meets at least one of the user-specified criteria when the location of the second authorized user is within a predetermined distance of the the establishment that meets at least one of the user-specified criteria.

7. A method as defined in claim 1, wherein sending a notification to at least one of the first authorized user and the second authorized user comprises sending a notification over the communication network to a data acquisition device associated with at least one of the first authorized user and the second authorized user.

8. A method of managing data that is received from at least one user over a communication network, comprising:
receiving data from a first node of the communication network, the data indicating at least one criterion related to whether an item on a list of at least one item can be obtained at an establishment;
obtaining a location of a remote device, wherein the remote device is a node of the communication network;
receiving additional data from a second node of the communication network, the additional data indicating a change or addition to at least one of the criterion provided by the data received from the first node;
identifying an establishment as a qualified establishment when an item on the list can be obtained at the establishment;
determining whether the location of the remote device relative to the location of the qualified establishment satisfies a condition; and
transmitting an alarm over the communication network to the remote device when the condition is satisfied.

9. A method as defined in claim 8, wherein an additional criterion relates to a price of an item on the list such that an establishment can be a qualified establishment only when an item on the list can be obtained at the establishment for a price specified in the data.

10. A method as defined in claim 8, wherein an additional criterion relates to an establishment name such that an establishment can be a qualified establishment only when the establishment has the establishment name.

11. A method as defined in claim 8, wherein an additional criterion describes a location such that an establishment can be a qualified establishment only when the establishment has a location that matches the location described in the criterion.

12. A method as defined in claim 8, wherein determining whether the location of the remote device relative to the location of the qualified establishment satisfies a condition comprises determining whether the location of the remote device is within a predetermined distance to the location of the qualified establishment.

13. A method as defined in claim 8, wherein transmitting an alarm over the communication network to the remote device comprises sending a notification to the remote device that an item from the list can be obtained at the qualified establishment.

14. A method as defined in claim 13, wherein transmitting an alarm over the communication network to the remote device additionally comprises sending a notification to the remote device indicating that the qualified establishment is nearby.

15. A method as defined in claim 8, additionally comprising making the data available only to a node that is operated by an authorized user.

16. A program product for use in a computer system that executes program steps recorded in a computer-readable media to perform a method for managing information that is received from one or more users over a communication network in a communication environment, the program product comprising:
  a recordable media;
  a program of computer-readable instructions executable by the computer system to perform operations comprising:
    receiving information from a first node of the communication network, the information indicating user-specified criteria related to whether an item on a list of at least one item can be obtained at an establishment;
    storing the information at a central database that is linked to the communication network;
    receiving information from a second node of the communication network, the information indicating a change in the user-specified criteria;
    monitoring the user's location within the communication environment;
    determining if the user is located near an establishment that satisfies one or more of the user-specified criteria; and
    sending a notification to the user when the user is located near an establishment at which the user can obtain an item on the list.

17. A system that manages data that is received from at least one user over a communication network in a communication environment, the system comprising one or more processors that execute program instructions and receive a data set, wherein the program instructions are executed to cause the processor to:
  receive data from a first node of the communication network, the data indicating at least one criterion related to whether an item on a list of at least one item can be obtained at an establishment located in the communication environment;
  obtain a location of a remote device in the communication environment, wherein the remote device is a node of the communication network;
  receive additional data from a second node of the communication network, the additional data indicating a change to at least one criterion that can be satisfied by an establishment located in the communication environment;
  identify an establishment as a qualified establishment when an item on the list can be obtained at the establishment;
  determine whether the location of the remote device relative to the location of the qualified establishment satisfies a condition; and
  transmit an alarm over the communication network to the remote device when the condition is satisfied.

18. A method as defined in claim 1, wherein information received from the first authorized user is received via an appliance.

19. A method as defined in claim 18, wherein the appliance is a refrigerator.

20. A method as defined in claim 18, wherein the appliance is a desktop computer.

21. A method as defined in claim 18, wherein the appliance is a office appliance.

22. A method as defined in claim 18, wherein the appliance is a household appliance.

23. A method as defined in claim 18, wherein the appliance includes a user data entry device.

24. A method as defined in claim 18, wherein the appliance detects conditions and reports such conditions to a server.

25. A method of managing information received from at least one user over a communication network, comprising:
  receiving information from a first authorized user via a refrigerator appliance, the information indicating user-specified criteria related to a location at which the user-specified criteria can be met;
  storing the information at a central database that is linked to the communication network;
  receiving from at least one of the first authorized user and a second authorized user, modifications to the user-specified criteria;
  monitoring the second authorized user's location; and
  sending a notification to at least one of the first authorized user and the second authorized user when the second authorized user is located near a location that meets at least one of the user-specified criteria.

* * * * *